United States Patent
Brevick (10) Patent No.: US 9,328,776 B2
(45) Date of Patent: May 3, 2016

(54) DRY-CLUTCH TRANSMISSION WITH COOLING TECHNIQUES

(71) Applicant: FORD GLOBAL TECHNOLOGIES, LLC, Dearborn, MI (US)

(72) Inventor: John Edward Brevick, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 46 days.

(21) Appl. No.: 14/306,285

(22) Filed: Jun. 17, 2014

(65) Prior Publication Data

US 2014/0291108 A1 Oct. 2, 2014

Related U.S. Application Data

(62) Division of application No. 12/896,868, filed on Oct. 2, 2010, now Pat. No. 8,783,433.

(51) Int. Cl.
*F16D 13/72* (2006.01)
*F16D 13/64* (2006.01)
*F16D 13/70* (2006.01)

(52) U.S. Cl.
CPC ............... *F16D 13/72* (2013.01); *F16D 13/64* (2013.01); *F16D 13/70* (2013.01); *F16D 2300/0212* (2013.01); *F16D 2300/26* (2013.01)

(58) Field of Classification Search
CPC .......................... F16D 13/72; F16D 2300/0212
USPC ........................................ 192/113.23–113.26
See application file for complete search history.

(56) References Cited

U.S. PATENT DOCUMENTS

| | | | |
|---|---|---|---|
| 1,024,737 A | 4/1912 | Miller | |
| 1,746,365 A * | 2/1930 | Schunemann | F16D 27/115 192/113.23 |
| 2,198,792 A | 4/1940 | Schjolin | |
| 2,205,629 A | 6/1940 | Peterson | |
| 2,310,203 A | 2/1943 | Banker | |
| 2,777,965 A | 1/1957 | Winther | |
| 3,007,561 A | 11/1961 | Harting | |
| 3,018,864 A * | 1/1962 | Elfes | F16D 21/06 192/113.26 |
| 3,171,527 A | 3/1965 | Ott | |
| 3,251,437 A | 5/1966 | Moyer et al. | |
| 3,335,834 A | 8/1967 | Wach | |
| 3,661,238 A | 5/1972 | Davies | |
| 3,664,467 A | 5/1972 | Lucien et al. | |
| 4,020,937 A | 5/1977 | Winter | |
| 4,294,343 A | 10/1981 | Reh | |
| 4,382,497 A | 5/1983 | Sakai et al. | |
| 4,388,196 A | 6/1983 | Lucia | |
| 4,561,522 A | 12/1985 | Dayen | |

(Continued)

FOREIGN PATENT DOCUMENTS

| | | |
|---|---|---|
| CN | 1920318 A | 9/2006 |
| GB | 2097873 A | 11/1982 |

(Continued)

*Primary Examiner* — Richard Lorence
(74) *Attorney, Agent, or Firm* — James Dottavio; MacMillan, Sobanski & Todd, LLC (57) ABSTRACT

The present disclosure relates to a dry-clutch transmission having various cooling techniques. Some techniques include forming different structural features on transmission components so as to create an organized air flow. The disclosed techniques are applicable to both opened and closed transmission housings.

15 Claims, 9 Drawing Sheets

(56) References Cited

U.S. PATENT DOCUMENTS

| | | | |
|---|---|---|---|
| 4,657,128 A | 4/1987 | Fujito et al. | |
| 4,667,794 A | 5/1987 | Martinez-Corral et al. | |
| 4,712,660 A * | 12/1987 | Erndt | D05B 69/125 |
| | | | 192/113.23 |
| 4,721,195 A | 1/1988 | Majima | |
| 4,846,315 A | 7/1989 | Dayen | |
| 4,886,153 A | 12/1989 | Takenaka et al. | |
| 4,923,043 A | 5/1990 | Okuno | |
| 4,923,046 A | 5/1990 | Uenohara | |
| 5,072,816 A | 12/1991 | Takeuchi et al. | |
| 5,099,973 A | 3/1992 | Flotow et al. | |
| 5,638,932 A | 6/1997 | Mikukami | |
| 5,722,524 A | 3/1998 | Mikukami et al. | |
| 5,732,808 A | 3/1998 | Viola et al. | |
| 5,845,757 A | 12/1998 | Csonka | |
| 5,857,547 A | 1/1999 | Dequesnes | |
| 5,904,234 A | 5/1999 | Kosumi et al. | |
| 5,996,757 A | 12/1999 | Hofmann et al. | |
| 6,129,191 A | 10/2000 | Kummer et al. | |
| 6,145,633 A | 11/2000 | Niederstadt et al. | |
| 6,151,766 A | 11/2000 | Everett | |
| 6,279,709 B1 | 8/2001 | Orlamunder | |
| 6,293,370 B1 | 9/2001 | McCann et al. | |
| 6,352,147 B1 | 3/2002 | Orlamunder et al. | |
| 6,520,136 B2 | 2/2003 | Ito et al. | |
| 6,568,518 B2 | 5/2003 | Sarar | |
| 6,695,743 B2 | 2/2004 | Tanaka et al. | |
| 6,745,884 B2 | 6/2004 | Hick et al. | |
| 6,823,975 B2 | 11/2004 | Martin | |
| 7,063,196 B2 | 6/2006 | Wakabayashi et al. | |
| 7,380,645 B1 | 6/2008 | Ruiz | |
| 2001/0025759 A1 | 10/2001 | Sarar | |
| 2005/0126877 A1 | 6/2005 | Schneider et al. | |
| 2009/0000577 A1 | 1/2009 | Miyagawa | |
| 2009/0101312 A1 | 4/2009 | Gooden et al. | |
| 2009/0114498 A1 | 5/2009 | Arnold et al. | |
| 2009/0314591 A1 | 12/2009 | Suppiah | |

FOREIGN PATENT DOCUMENTS

| | | | |
|---|---|---|---|
| JP | 61235219 A | 10/1986 | |
| JP | 03189419 B2 | 8/1991 | |
| JP | 04029622 B2 | 1/1992 | |
| JP | 05106642 A | 4/1993 | |
| JP | 07310755 A | 11/1995 | |
| JP | 11254981 A | 9/1999 | |
| JP | 2002364362 A | 12/2002 | |
| JP | 2004360460 A | 12/2004 | |
| JP | 2005003134 A | 1/2005 | |
| JP | 2006283872 A | 10/2006 | |

* cited by examiner

DRY-CLUTCH TRANSMISSION WITH COOLING TECHNIQUES

CROSS REFERENCE TO RELATED APPLICATIONS

The present patent application claims the benefit of and is a divisional of U.S. patent application Ser. No. 12/896,868, filed Oct. 2, 2010, which is incorporated herein by reference.

TECHNICAL FIELD

The present disclosure relates to dry-clutch transmissions with various heat transfer techniques including clutch or plate features that promote an organized air flow.

BACKGROUND OF INVENTION

Conventional vehicle transmissions predominantly employ wet clutches to accomplish gear shifting. Transmissions typically include a transmission fluid which is recycled throughout the transmission. Wet clutches generally provide greater heat transfer and temperature control than dry clutches. Wet clutches also, however, have a lower coefficient of friction than dry clutches. Wet clutches are further known to slip pre-engagement.

Dry clutches tend to provide higher coefficients of friction than wet clutches. Dry clutches can provide lower costs and complexity. Still, dry clutches can have thermal management issues. For example, dry clutches can reach higher temperatures in repeat vehicle launch events with heavy vehicle load and road grade conditions. Some existing designs have attempted to reduce transmission heating in wet clutch transmission. U.S. Pat. No. 6,568,518 titled "Clutch for a Power Train of a Motor Vehicle" discloses a clutch having fan blades configured to generate an air stream over the surface of the flywheel. The blades disclosed are flowing in a single direction which produces a relatively undisturbed fluid flow path. A more viscous flow would yield greater heat transfer.

Therefore, it is desirable to have a dry-clutch transmission with improved heat transfer techniques.

SUMMARY OF INVENTION

The present invention may address one or more of the above-mentioned issues. Other features and/or advantages may become apparent from the description which follows.

Certain embodiments of the present invention regard a dry-clutch transmission, including: a first plate having a plurality of blades formed therein. At least one of the plurality of blades is positioned in a different direction than the other blades.

Another exemplary embodiment of the present invention involves a dry-clutch transmission with cooling system, the system including: a drive plate having a plurality of blades formed therein; and a transmission component having a conduit configured to guide air away from a center of the transmission.

Another exemplary embodiment of the present invention regards a method of cooling a vehicle powertrain through generating an organized flow pattern with respect to the powertrain, the method including: providing a first conduit formed in a drive plate, the first conduit configured to pull air towards the center of the transmission; providing a second conduit on the drive plate, the second conduit configured to exhaust air away from the center of the transmission; pumping air through the transmission; and guiding air toward the outside of the transmission housing.

Yet another embodiment of the present invention regards a method of cooling a powertrain, the method including the step of: forming a plurality of ribs on a cylinder block; and flowing engine coolant through the cylinder block.

One advantage of the present teachings is that they provide a relatively lower cost design than a wet clutch transmission with significant heat reduction capabilities. Transmission durability is enhanced with implementation of the cooling systems.

Another significant advantage of the present teachings is that they provide a less complex transmission than a wet clutch transmission with significant heat reduction techniques. Some of the disclosed cooling techniques generate an organized flow within the transmission housing without requiring an external fan for cooling.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings wherein like characters represent the same or corresponding parts throughout the several views there are shown exemplary dry-clutch transmissions with cooling techniques that provide improved heat transfer. Several design features are incorporated into components of the transmission in order to generate an organized flow of air in the transmission housing. Some exemplary design features include using fan blades on a drive plate positioned in opposing directions. Radial and axial apertures are placed in a pressure plate and flywheel to exhaust air away from a center of the transmission and reduce clutch heat in the housing. Ribbing is also included on the engine block and oil pan to improve convective heat transfer from the transmission housing to the engine coolant. Some or all of these features can work in concert to create an organized flow and improve heat transfer from the transmission clutch.

Figure 1:
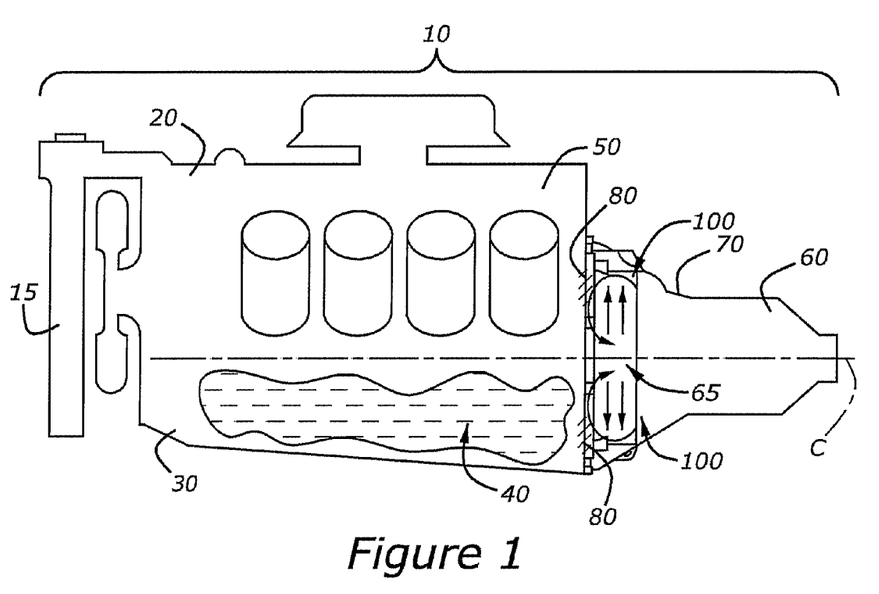
FIG. 1 is a side, partial cross-sectional view of an engine and dry-clutch transmission with organized flow according to an exemplary embodiment of the present invention.

Referring now to FIG. 1, there is shown therein a powertrain 10 for use in a vehicle. The powertrain 10 includes an internal combustion engine 20. The engine illustrated is an inline four cylinder engine. A radiator 15 is positioned at the front of the engine. An oil sump (or pan) 30 which holds the engine's oil reserves is at the base of the engine. The oil 40 is cycled through the engine to lubricate engine bearings. The block 50 is attached to a transmission 60 through a crankshaft (not shown). The transmission has a housing 70 that rests flush against the cylinder block 50. In this embodiment, the engine block 50 includes a series of ribs 80 (or beads) formed on the outer surface of the block and the oil pan 30. The ribs 80 increase the surface area in which engine oil, coolant and/or air engage thus generating more heat transfer at the upper-rear and lower-rear portions of the engine. In this manner, heat is transferred from an input clutch 65 where the clutch is running warmer than the engine.

The transmission 60, of FIG. 1, is a dry-clutch transmission. The transmission 60 can be any manual, automatic, continuously-variable or electrically-variable transmission. In this embodiment, the transmission is a dual-clutch automatic transmission. FIG. 1 conveys an exemplary organized air flow 100 in the forward portion of the transmission housing 70 where the input clutch 65 is positioned. On the engine side, heat travels from clutch 65 to the engine block 50 and bell housing, engine oil and coolant to the radiator and is dispensed into ambient. In this embodiment, the transmission 60 is a closed system; air is not taken into or exhausted out of the transmission. In other embodiments, the transmission is an open system; ambient air is filtered into the transmission and exhausted therefrom. Referring back to the embodiment shown in FIG. 1, the air flow 100 includes two primary streams. Air is forced away from the center of the transmission, C. During engine operation, various clutch features work in concert with the angular momentum of clutch components to support this air stream 100 as shown in the examples below. The second stream cycles air from the outer diameter of the transmission (or transmission housing 70) toward the center of the transmission, C. Various clutch features work in concert with the angular momentum of clutch components to support this air stream as shown in the examples below.

Figure 2:
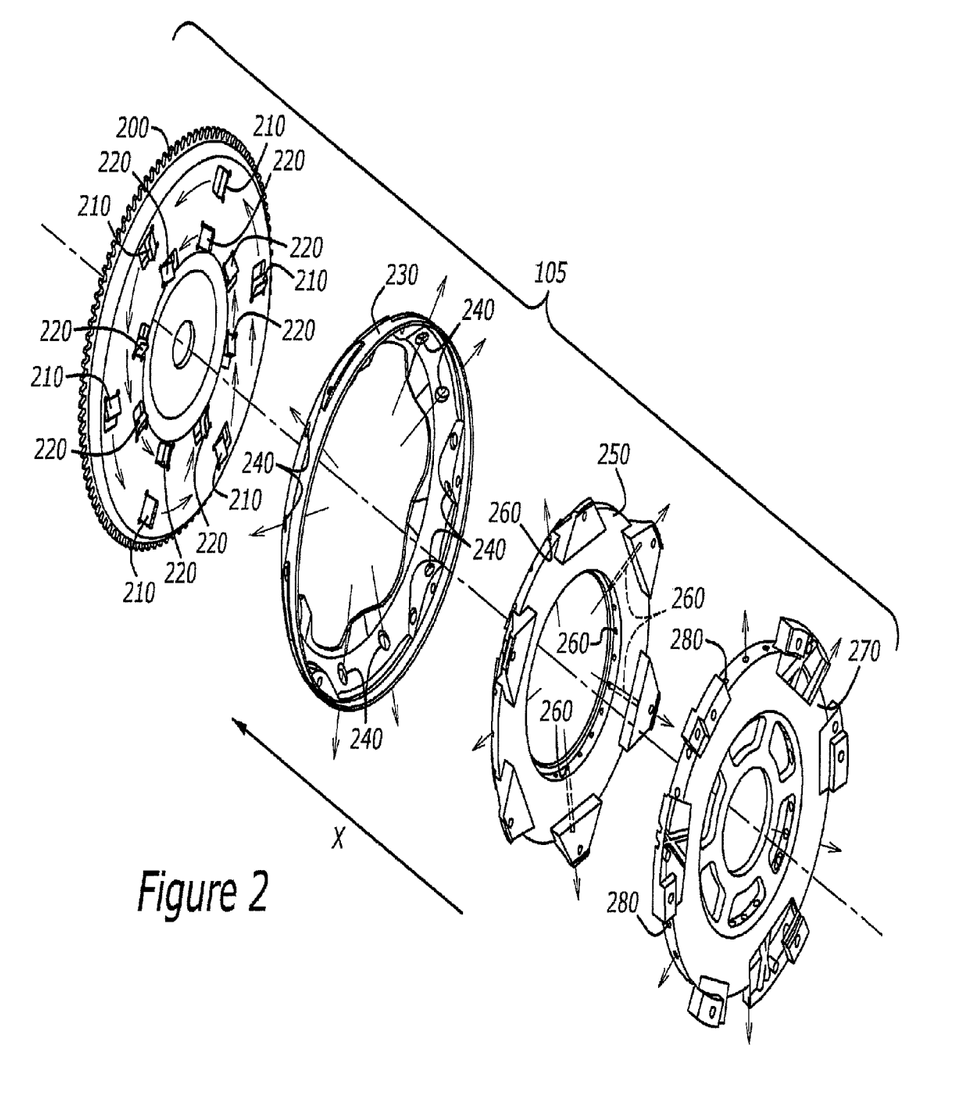
FIG. 2 is an exploded view of a dry-clutch assembly compatible with the transmission of FIG. 1.

Referring now to FIG. 2, there is shown therein an exploded view of an exemplary clutch assembly compatible with the transmission 60 of FIG. 1. The transmission includes a cooling system 105. Each of the four components in the system 105 include structural features that guide air in the direction of the organized flow path 100 partially shown in FIG. 1. Each component includes a series of conduits that direct air in the predetermined flow path. A drive plate 200 is in the most forward position of the transmission. Drive plate 200 includes two sets of blades 210 and 220—one set proximate to the outer diameter of the plate face (210) and another set proximate to the inner diameter of the plate face (220). Blades 210 are positioned in a different direction than blades 220. Blades 210 are oriented to receive air in a clockwise direction from a transmission-to-engine perspective—the X-axis as shown in FIG. 2; blades 220 are oriented to receive air in a counterclockwise direction. Blades 220 direct air toward the clutch center. Blades 210 direct air away from the clutch center or toward the outer diameter of the clutch.

A clutch cover 230 is also included in the assembly of FIG. 2. The clutch cover 230 includes a series of apertures 240 along the perimeter of the cover. The apertures 240 enable ingress and/or egress of air from the assembly. A pressure plate 250 nests concentrically within the clutch cover 230. Pressure plate 250 includes various channels 260 that extend radially with respect to the pressure plate. Air is guided out toward the outer diameter of the pressure plate 250. A flywheel plate 270 is also concentrically aligned with the other members of the clutch assembly. Clutch plates (not shown) are assembled between the pressure plate 250 and flywheel plate 270. Flywheel plate 270 includes radial channels 280 that guide air toward the outer diameter of the flywheel plate.

Figure 3:
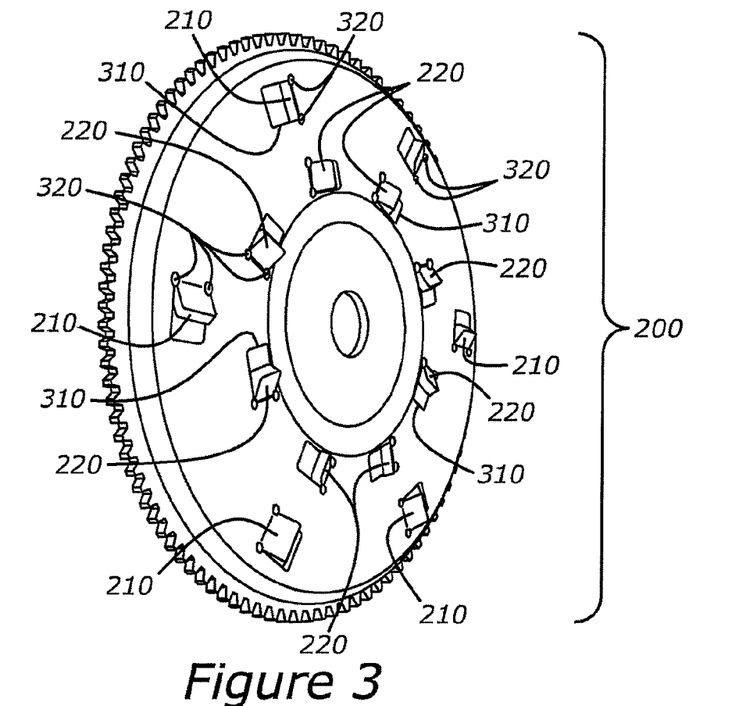
FIG. 3 is a perspective view of the clutch drive plate of FIG. 2.
Figure 4:
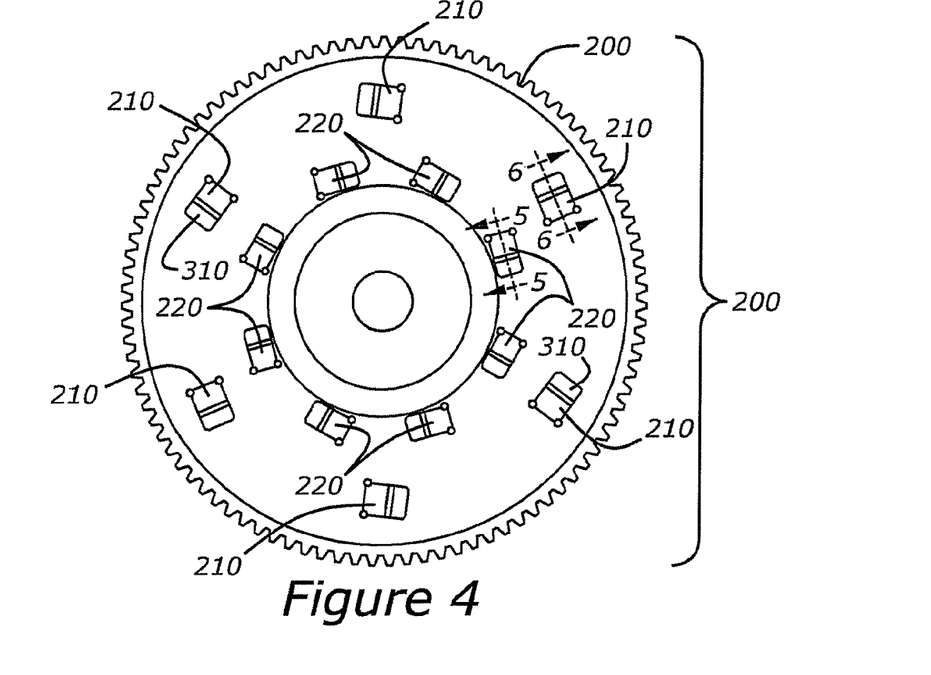
FIG. 4 is a front view of the drive plate of FIG. 3.

Giving particular attention in the drive plate 200, as shown in FIGS. 3-4, the drive plate has two sets of blades 210 and 220 that act as conduits for air. Blades 210 are proximate the outer diameter of the drive plate. In this embodiment, six blades are included in the first set of blades. Blades 210 are positioned 60 degrees apart with respect to each other. Blades 210 are configured to direct air away from the clutch center or toward the outer diameter of the clutch. Each blade includes a flange edge 300 bent at a predetermined angle. In this embodiment, the flanges 300 are bent at an angle of 30 degrees. Drive plate 200 includes perforations 310 to support the extension of the blades 210 and 220 from drive plate. An outline of the blades 210 and 220 are cut into the drive plate 200. Drive plate 200 also includes two semi-circular apertures 320 to alleviate stress in at the corners of the blades.

Blades 220, as shown in FIGS. 3-4, are positioned in a different direction than blades 210. Blades 220 act as a conduit for air and are oriented to direct air toward the clutch center. Blades 220 are proximate the inner diameter of the drive plate 200. In this embodiment, eight blades are included in the second set of blades. Blades 220 are positioned 45 degrees apart with respect to each other. Each blade includes a flange edge 300 bent at a predetermined angle. The opposing directions of blades 210 and 220, respectively, create a more turbulent flow path between the clutch 65, bell housing 70, cylinder block 50 and oil pan 30 (as shown in FIG. 1).

Figure 5:
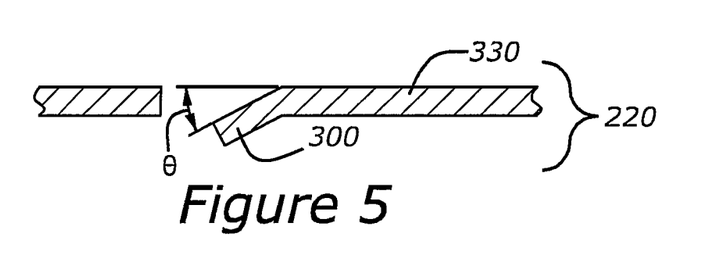
FIG. 5 is a cross-sectional view of the drive plate of FIG. 3 along line 5-5.
Figure 6:
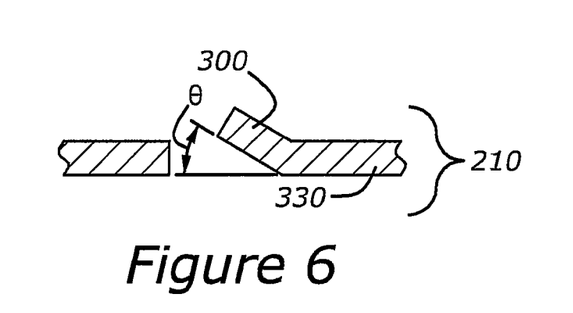
FIG. 6 is a cross-sectional view of the drive plate of FIG. 3 along line 6-6.

FIGS. 5 and 6 illustrated the opposing orientation of blades 220 and 210, respectively. FIG. 5 illustrates a cross-sectional view of the drive plate 200 of FIG. 3 along line 5-5. Each blade 210, 220 is angled towards the engine cylinder block 50 (as shown in FIG. 1). A blade from blade set 220 is show in FIG. 5. Blade 220 is angled approximately 30 degrees counterclockwise from the drive plate surface 330. FIG. 6 illustrates a cross-section view of the drive plate of FIG. 3 along line 6-6. A blade from blade set 210 is show therein. Blade 210 is angled approximately 30 degrees clockwise from the drive plate surface 330.

Drive plate 200 is stamped. Blades 210, 220 are manufactured from secondary manufacturing operations such as cutting and stamping. The disclosed drive plate is composed of steel.

Figure 7:
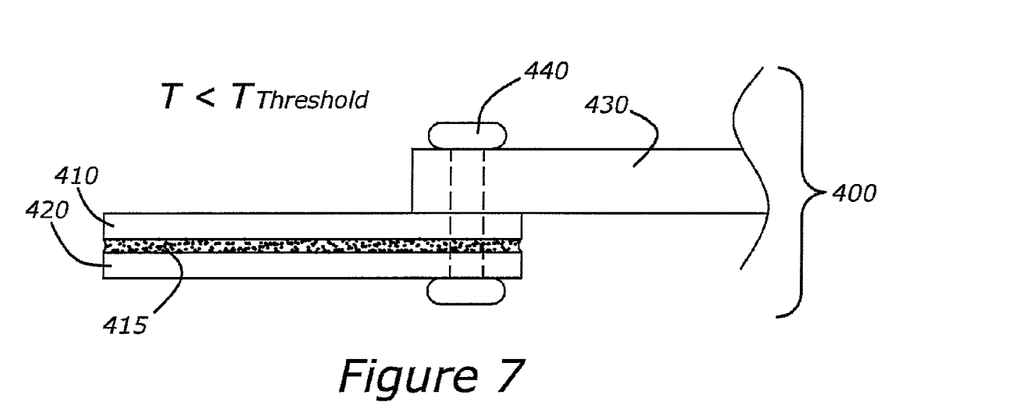
FIG. 7 is a side view of a drive plate with blades according to another exemplary embodiment.
Figure 8:
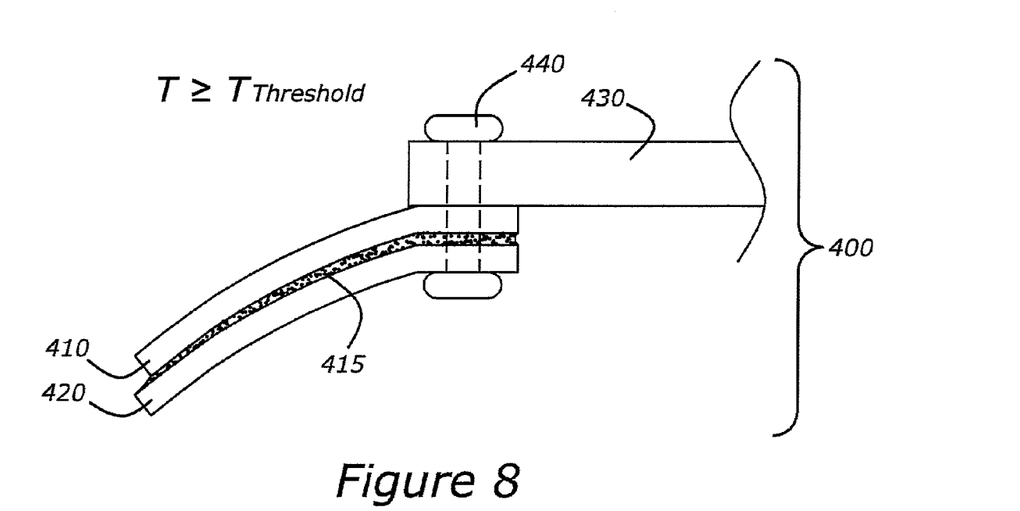
FIG. 8 is a side view of the drive plate and blades of FIG. 7.

In another embodiment, as shown in FIGS. 7-8, drive plate 400 (as partially illustrated) has a bi-metal composition. FIGS. 7 and 8 are side views of a drive plate 400 with blades 410 and 420 adhered together with a bonding material 415. The body of drive plate 430 is composed of a different material than the blades 410 and 420. As shown in the figures, blades 410 and 420 are attached to the drive plate 400 using a fastener 440. In this case, the fastener 440 is a rivet. Other fasteners can be used such as, for example, welds, nuts and bolts, clamps or screws. Blades 410 and 420 have shape memory. Blades 410 and 420 are pre-torqued with respect to the drive plate body 430, as shown in FIG. 8. Blades 410 and 420 are thermally actuable. Once the transmission reaches a predetermined threshold—$T_{Threshold}$, blades 410, 420 bend with respect to the plate body 430. At room temperature, blades 410 and 420 are flat with respect to the body of the drive plate 430. In one embodiment, the threshold temperature for the blades is 200 degrees Celsius. As the temperature increases the blades 410, 420 raise. In this embodiment, the maximum deformation of blades 410 and 420 is seen at 200 degrees Celsius. In another embodiment, the threshold temperature for the blades is 100 degrees Celsius. The threshold temperature for blades 410, 420 can be set according to system cooling targets. Different materials can be used to accomplish thermal actuation at a desired temperature. In the illustrated embodiment, blade 410 is composed of an aluminum material and blade 420 is composed of steel. Exemplary combinations for the bi-metal drive plates blades include steel-aluminum, steel-copper, steel-tin, aluminum-aluminum, aluminum-tin, and aluminum-copper. Other material combinations, such as those including titanium or magnesium, will be appreciated by an ordinary artisan.

Figure 9:
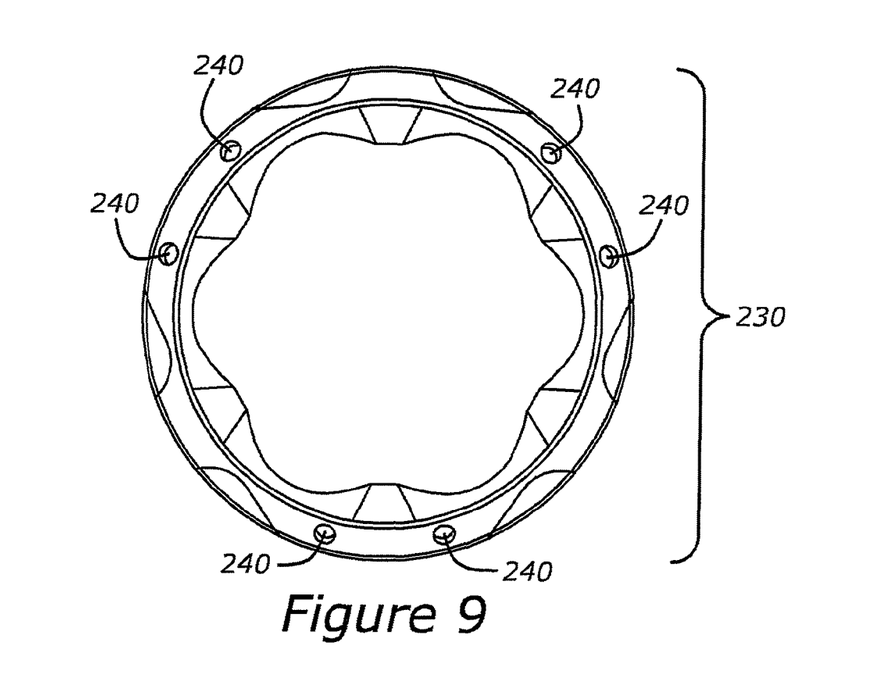
FIG. 9 is a front view of the clutch cover of FIG. 2.
Figure 10:
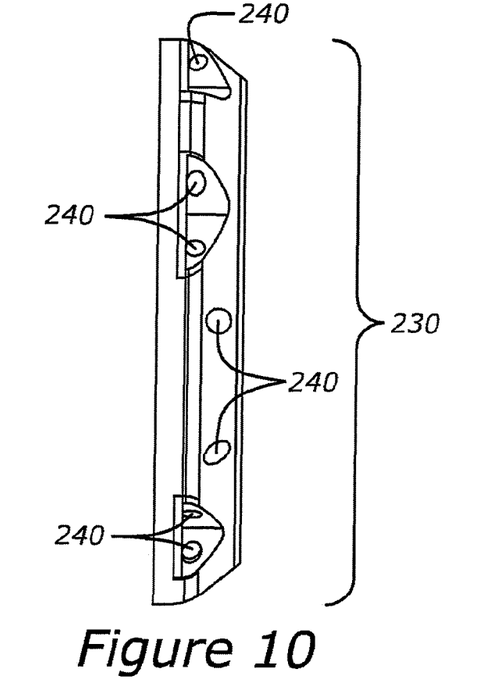
FIG. 10 is a side view of the clutch cover of FIG. 2.

Referring now to FIGS. 9-10, there is shown therein the clutch cover 230 of FIG. 2. Clutch cover 230 partially covers or encases the clutch assembly. Cover 230 can be secured to the drive plate 200 (as shown in FIG. 2). In one embodiment, cover 230 is bolted onto the drive plate. Cover 230 includes a series of conduits 240 enabling air to flow out of the clutch assembly—apertures 240 are formed in the outer perimeter of the clutch cover. Apertures 240 work in concert with other clutch features to guide air from the input shaft of the transmission to the housing. In this embodiment, apertures 240 are roughly ½" in diameter. Apertures 240 can be of varying sizes. Apertures 240 can be formed using any number of techniques. Apertures 240 can be machined into the cover. In one embodiment, apertures 240 are molded into the cover 230. Cover 230 is composed of stamped steel in this embodiment. Cover 230 can be composed of any number of materials including aluminum, magnesium or cast iron.

Figure 11:
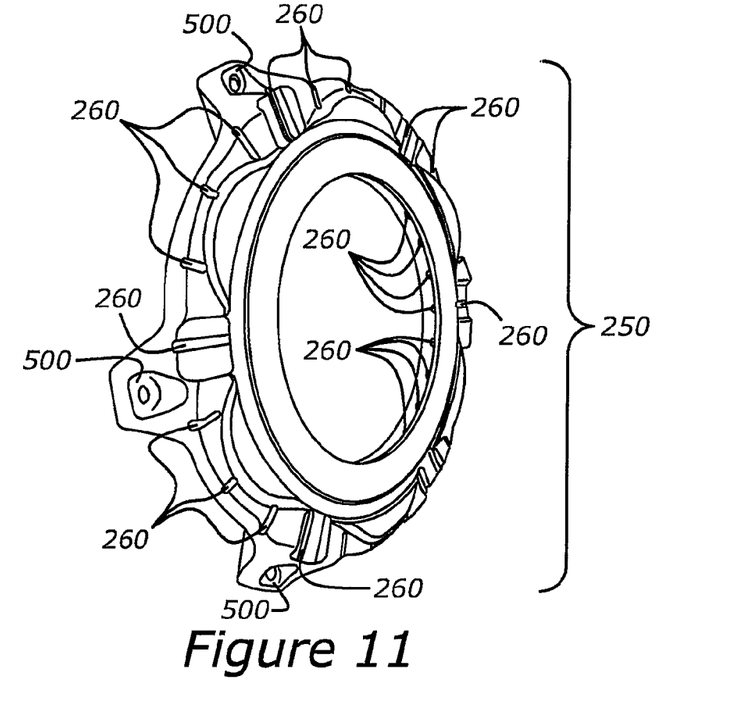
FIG. 11 a perspective view of the clutch pressure plate of FIG. 2.
Figure 12:
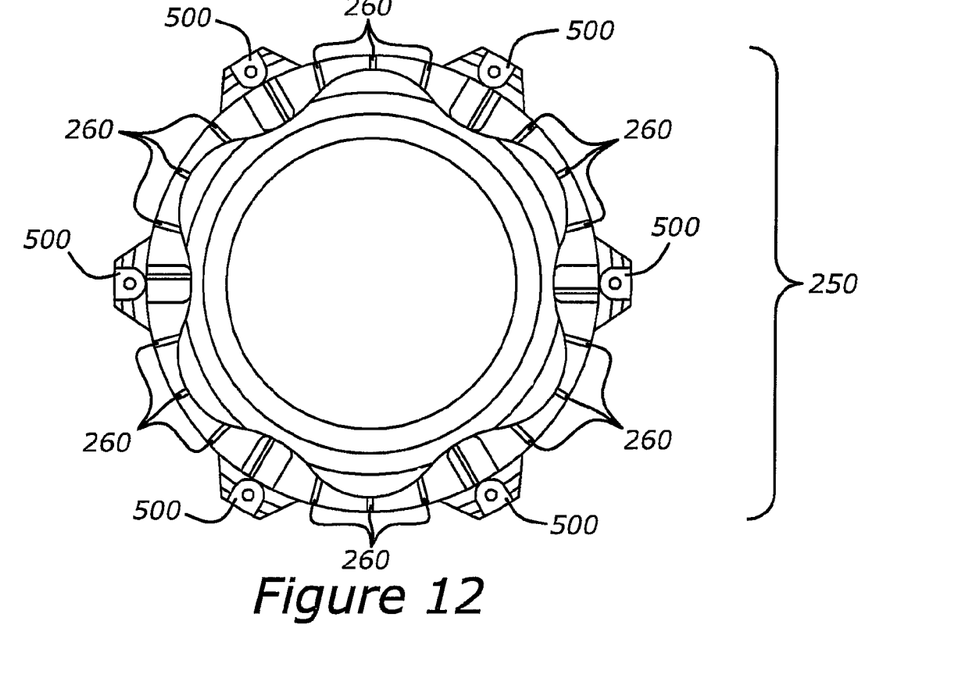
FIG. 12 is a front view of the clutch pressure plate of FIG. 2.

Referring now to FIGS. 11 and 12, there is shown therein the pressure plate 250 of FIG. 2. Pressure plate 250 nests inside of clutch cover 230 of FIG. 2. Pressure plate 250 is affixed to the drive plate 200 and clutch cover 230. In this embodiment, pressure plate 250 is bolted onto the assembly at 500. Pressure plate 250 includes a series of conduits 260 enabling air to flow out of the clutch assembly—radial channels 260 formed in the outer perimeter of the pressure plate 250. As shown in FIG. 12, pressure plate 250 has 24 channels 260. Channels 260 work in concert with other clutch features to guide air from the input shaft of the transmission to the housing. In this embodiment, channels 260 are roughly one eighth inch in diameter. Channels 260 can be of varying sizes. Channels 260 can be formed using any number of techniques.

In the illustrated embodiment, channels 260 are machined into the pressure plate 250. In one embodiment, the grooves are molded into the pressure plate 250 and the channels 260 are machined into the plate in a secondary process. Channels 260 are formed of cast iron in this embodiment. Pressure plate 250 can be composed of any number of materials including aluminum, magnesium or steel.

Figure 13:
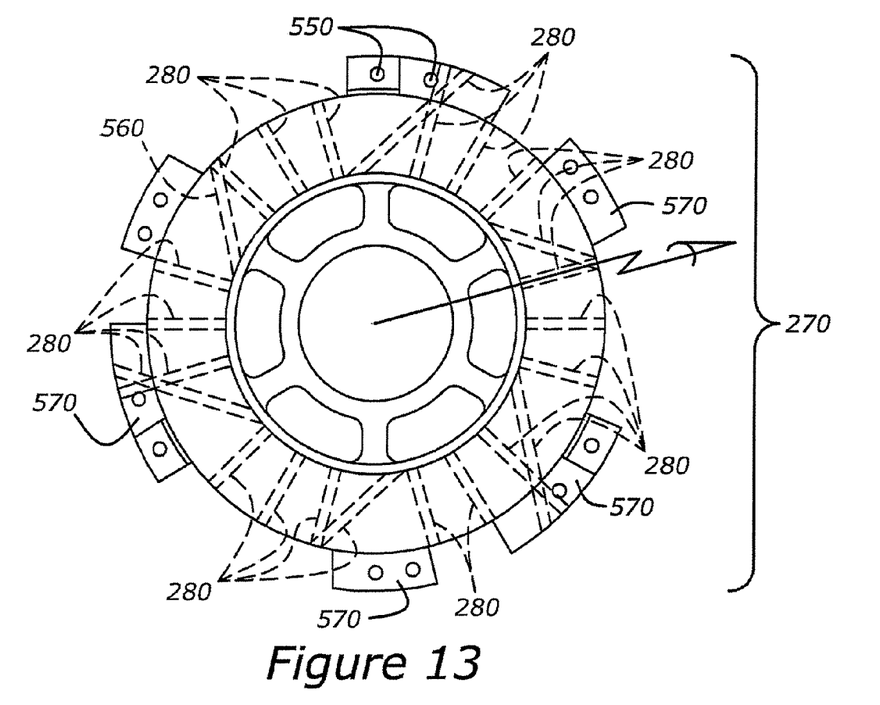
FIG. 13 is a front view of the flywheel of FIG. 2.
Figure 14:
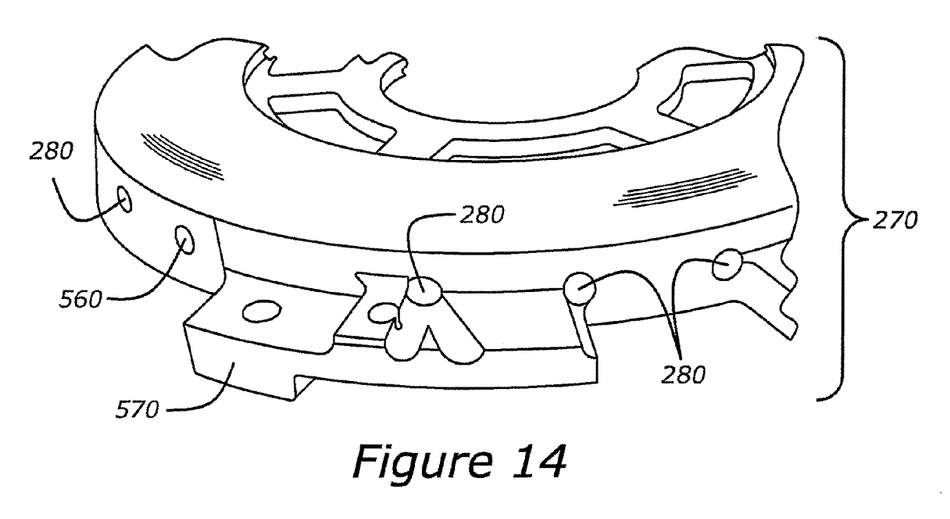
FIG. 14 is a perspective view of the flywheel of FIG. 2.

Now with reference to FIGS. 13 and 14, there is shown therein the flywheel plate 270 of FIG. 2. Flywheel is driven from a clutch cover (e.g., 230 as shown in FIG. 2) which is attached to the drive plate 200. A clutch plate, not shown, is positioned between the pressure plate 250 and flywheel plate 270. Flywheel plate 270 is arranged concentrically adjacent the pressure plate 250. Flywheel 270 is fixed to a second drive plate (not shown). Flywheel plate 270—as shown in FIGS. 13-14—attaches to the drive plate 200 through apertures 550. Flywheel plate 270 includes a series of conduits 280 enabling air to flow out of the clutch assembly; channels 280 are formed on in the outer perimeter of the flywheel plate 270. Channels 280 are formed in varying directions with respect to the radius of the flywheel plate 270. Four channels 280 are radially aligned. Channels 280 can be formed in avoidance of other structural features of the plate. For example, channel 560 is not radially aligned with the flywheel plate 270 but formed at an obtuse angle with respect to the radius of the plate. In this manner, channel 560 enables sufficient egress of air from the inner diameter of the flywheel without compromising the structural rigidity of flanges 570.

Flywheel plate 270, as shown in FIG. 14, includes 11 channels. Channels 280 work in concert with other clutch features to guide air from the input shaft of the transmission to the housing. In this embodiment, channels 280 are roughly one eighth inch in diameter. Channels 280 can be of varying sizes. Channels 280 can be formed using any number of techniques. In the illustrated embodiment, channels are machined into the flywheel plate 270. In one embodiment, the channels 280 are molded into the flywheel plate 270. In the illustrated embodiment, channels are machined into the plate in a secondary process. Channels 280 are cast in. Flywheel plate 270 can be composed of any number of materials including iron, steel, magnesium or aluminum. In the illustrated embodiments, flywheel plate 270 is die cast.

Figure 15:
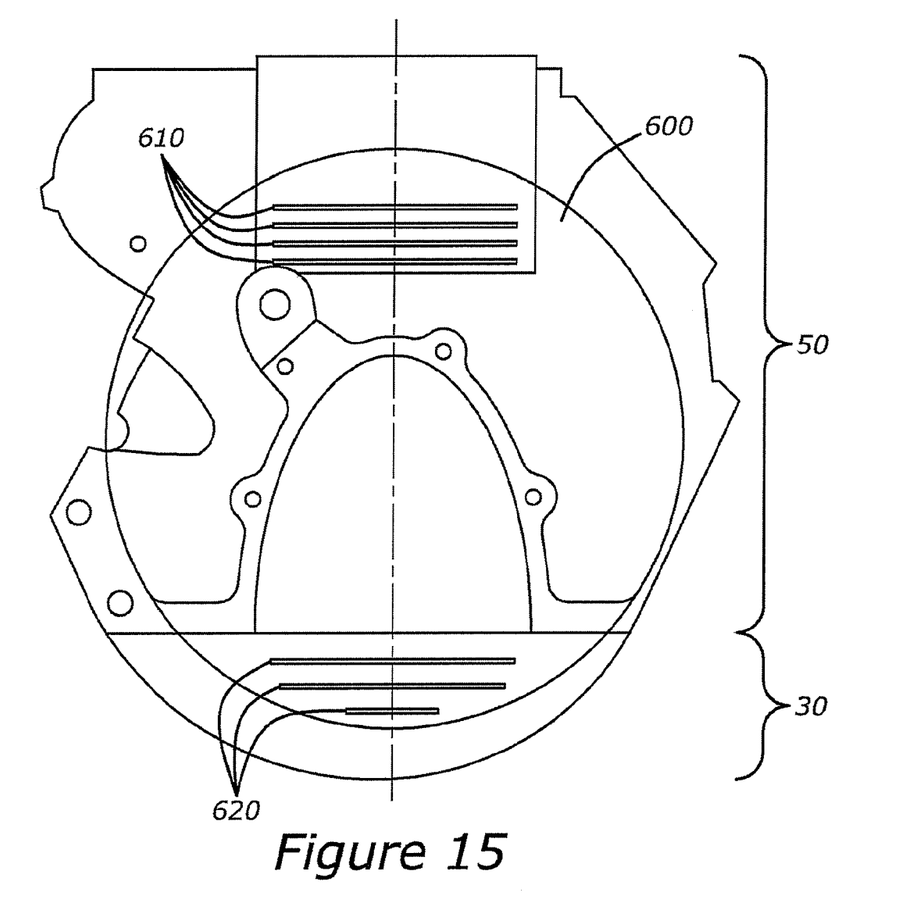
FIG. 15 is a rear view of the engine cylinder block and oil pan of FIG. 2.

Referring now to FIG. 15, the features incorporated on the engine block 50 that assist in thermal transfer from the transmission 60 (as shown in FIG. 1) are illustrated. Engine block 50 includes ribbing on the water jacket area of the block 50 outside the housing to improve heat transfer from the transmission housing air to the engine coolant system and vehicle radiator. A rear view of the engine bell housing 600 of FIG. 1 is shown in FIG. 15. The upper portion of the engine bell housing 600 includes a series of ribs 610 (or beads) on the outer surface of the housing. Ribs 610 consist of lateral protrusions formed into the engine bell housing. Ribs 610 are adjacent the cylinder block 50 and configured to promote greater heat transfer during operation by increasing the surface area that engine fluid contacts. A similar set of ribs 620 are incorporated onto the engine bell housing 600 at the base or bottom of the housing or oil pan 30. Ribs 620 are also formed in the outer surface of the oil pan 30. Ribs 620 are adjacent the oil sump or oil pan 30 and configured to enable greater heat transfer from a transmission input clutch. Ribs 610 and 620 improve the clutch-to-engine thermal transfer through convective cooling.

In the illustrated embodiment of FIG. 15, ribs 610, 620 are formed within the engine bell housing 600. Ribs 610, 620 are molded into the housing 600. In other embodiments, ribs 610, 620 are machined out of the housing; ribs are formed as recesses in the inner surface of the housing. Engine housing is composed of aluminum. Other feasible design materials can include cast iron or magnesium.

Also disclosed is an exemplary method of cooling a vehicle powertrain through generating an organized flow pattern (e.g., as shown in FIG. 2) with respect to the powertrain. The method includes the step of providing a first conduit formed in a drive plate, the first conduit configured to pull air towards the center of the transmission. Blades 220 formed on the drive plate of FIGS. 3-4 pull air towards the center of the transmission. The method includes providing a second conduit on the drive plate, the second conduit configured to exhaust air away from the perimeter of the clutch. Blades 210—faced in an opposing direction to blades 220—are configured to exhaust air away from the center of the transmission. The method also includes pumping air through the transmission; and guiding air toward the outside of the transmission housing.

Another method of cooling a powertrain is taught herein. The method includes the step of: forming a plurality of ribs on a cylinder block. The ribs are configured to cause turbulence in engine fluid flow. Exemplary ribs 610, 620 are shown in FIG. 15. The method also includes flowing engine coolant through the cylinder block. Ribs increase the surface area engine fluid contacts thus enabling greater heat transfer from the transmission.

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A method of cooling a vehicle powertrain, comprising:
providing a dry-clutch assembly having a drive plate having a first conduit configured to pull air towards a center axis of a transmission and a second conduit configured to exhaust air away from the center axis; the first conduit in the drive plate being a first set of holes spaced circumferentially around the drive plate, with a first set of blades out of plane from a face of the drive plate and each extending over a respective one of the first set of holes in a first direction, the first set of blades oriented to receive air and direct airflow through the first set of holes when the drive plate rotates in a counterclockwise direction from a transmission-to-engine perspective; and
pumping air through the transmission by rotating the drive plate.

2. The method of claim 1, further comprising:
guiding air away from the center axis through a radial channel in a clutch cover.

3. The method of claim 1, further comprising:
guiding air away from the center axis through a radial channel in a pressure plate.

4. The method of claim 1, further comprising:
guiding air away from the center axis through a radial channel in a flywheel plate.

5. The method of claim 1, further comprising:
flowing the air towards the center axis on a side of the drive plate adjacent to an engine block, causing the air to flow be-along a surface of the engine block.

6. The method of claim 5, further comprising:
flowing the air across ribs extending outward from the engine block.

7. The method of claim 5, further comprising:
flowing an engine coolant through the engine block adjacent to the surface of the engine block along which airflow from the transmission flows.

8. The method of claim 1, further comprising:
flowing the air towards the center axis on a side of the drive plate adjacent to an engine oil sump such the air flows along a surface of the oil sump.

9. The method of claim 8, further comprising:
flowing the air across ribs extending outward from the engine oil sump.

10. The method of claim 1, further comprising:
providing the drive plate having the second conduit in the drive plate being a second set of holes spaced circumferentially around the drive plate, with a second set of blades out of plane from the face of the drive plate and each extending over a respective one of the second set of holes in a second direction, different from the first direction, the second set of blades oriented to receive air and direct airflow through the second set of holes when the drive plate rotates in a clockwise direction from a transmission-to-engine perspective.

11. The method of claim 10, further comprising:
providing the drive plate such that the second set of blades are of a bi-metal construction attached to the drive plate and flex angularly relative to the face based on a temperature of the second set of blades.

12. The method of claim 1, further comprising:
providing the drive plate such that the first set of blades are of a bi-metal construction attached to the drive plate and flex angularly relative to the face based on a temperature of the first set of blades.

13. A method of cooling a vehicle powertrain, comprising:
providing a dry-clutch assembly having a drive plate having a first conduit pulling air toward a center axis of a transmission on a side of the drive plate adjacent to an engine block and a second conduit exhausting air away from the center axis; and
pumping air through the transmission by rotating the drive plate, causing airflow across ribs extending from the engine block.

14. A method of cooling a vehicle powertrain, comprising:
providing a dry-clutch assembly having a drive plate having a first conduit pulling air toward a center axis of a transmission on a side of the drive plate adjacent to an engine oil sump and a second conduit exhausting air away from the center axis; and
pumping air through the transmission by rotating the drive plate, causing airflow across ribs extending from the engine oil sump.

15. A method of cooling a vehicle powertrain, comprising:
providing a dry-clutch assembly having a drive plate having a first conduit pulling air toward a center axis of a transmission on a side of the drive plate adjacent to an engine block and a second conduit exhausting air away from the center axis;
pumping air through the transmission by rotating the drive plate; and
flowing an engine coolant through the engine block adjacent to a surface of the engine block along which airflow from the transmission flows.

* * * * *